United States Patent [19]

Valone et al.

[11] Patent Number: 5,560,897
[45] Date of Patent: Oct. 1, 1996

[54] PLASMA-ASSISTED CONVERSION OF SOLID HYDROCARBON TO DIAMOND

[75] Inventors: Steven M. Valone, Santa Fe; Stevan G. Pattillo; Mitchell Trkula, both of Los Alamos; Don M. Coates, Santa Fe, all of N.M.; S. Ismat Shah, Wilmington, Del.

[73] Assignee: The Regents of the University of California Office of Technology Transfer, Alameda, Calif.

[21] Appl. No.: 133,726

[22] Filed: Oct. 7, 1993

[51] Int. Cl.$^6$ ............................................. C01B 31/06
[52] U.S. Cl. ................................................ 423/446
[58] Field of Search ....................................... 423/446

[56] References Cited

U.S. PATENT DOCUMENTS

| 5,104,634 | 4/1992 | Calcote | 423/446 |
| 5,146,481 | 9/1992 | Garg et al. | 423/446 |
| 5,229,099 | 7/1993 | Roy | 423/449.7 |
| 5,374,414 | 12/1994 | Morrish et al. | 423/446 |

FOREIGN PATENT DOCUMENTS

| 63-117913 | 5/1988 | Japan | C30B 29/04 |

OTHER PUBLICATIONS

*Organic Chemistry*, Solonaons pp. 48–49, Rb. by Wiley & Sons, 1980.

Roy et al., "Diamond Synthesis Via a Low-Pressure Solid-State-Source Process", Mat. Res. Bull., vol. 28, pp. 861–866, 1993.

Li et al., "Orientation Relationship Between Chemical Vapor Deposited Diamond and Graphite substrates", J. Appl. Phys., vol. 73, Issue 2, pp. 711–715, 1993.

Ting et al., "Diamond–Infiltrated–Carbon–Carbon Composites", Diamond and Related Materials, vol. 2, pp. 1069–1077, 1993.

Roy et al., "Crystallization of Diamond at 1 ATM from Carbon–Metal Mixtures," J. of Mater. Chem., vol. 3, Issue 6, pp. 685–686, 1993.

*Primary Examiner*—Michael Lewis
*Assistant Examiner*—Stuart L. Hendrickson
*Attorney, Agent, or Firm*—Bruce H. Cottrell; William A. Eklund

[57] ABSTRACT

A process of preparing diamond, e.g., diamond fiber, by subjecting a hydrocarbon material, e.g., a hydrocarbon fiber, to a plasma treatment in a gaseous feedstream for a sufficient period of time to form diamond, e.g., a diamond fiber is disclosed. The method generally further involves pretreating the hydrocarbon material prior to treatment with the plasma by heating within an oxygen-containing atmosphere at temperatures sufficient to increase crosslinking within said hydrocarbon material, but at temperatures insufficient to melt or decompose said hydrocarbon material, followed by heating at temperatures sufficient to promote outgassing of said crosslinked hydrocarbon material, but at temperatures insufficient to convert said hydrocarbon material to carbon.

14 Claims, 4 Drawing Sheets

PLASMA-ASSISTED CONVERSION OF SOLID HYDROCARBON TO DIAMOND

FIELD OF THE INVENTION

The present invention-relates to synthetic diamond and more particularly to the preparation of synthetic diamond from a solid hydrocarbon using a plasma, e.g., a hydrogen plasma. This invention is the result of a contract with the Department of Energy (Contract No. W-7405-ENG-36).

BACKGROUND OF THE INVENTION

Plasma processes for the preparation of diamond are well known and generally involve the use of a plasma to generate large amounts of necessary nonequilibrium gas-phase species such as atomic hydrogen. For example, plasma enhanced chemical vapor deposition has generally used a feedstock of a hydrocarbon-hydrogen mixture in forming the plasma to deposit diamond upon a target substrate. Recently researchers have used an essentially pure hydrogen plasma to convert a solid carbon form such as graphite or carbon black into diamond.

Together with the great interest in preparing diamond or coating substrates with diamond, there is also considerable interest in preparing diamond fibers or diamond-coated fibers, for example, diamond-coated graphite fibers. For example, Ting et al. in Diamond and Related Materials, 2 (1993), 1069–1077, describe diamond-infiltrated carbon-carbon composites including diamond coating of the carbon fibers within the carbon-carbon composite. Further, U.S. Pat. No. 4,957,591 describes a process for preparing needle-like or fibrous diamond by depositing columnar diamond and etching off the support or template.

It is an object of the present invention to provide a process of converting a solid hydrocarbon material to a diamond material or to a composite material including a diamond layer and a hydrocarbon layer.

It is a further object of the present invention to provide a process of converting a hydrocarbon fiber to a diamond fiber or a composite fiber including a diamond layer and a hydrocarbon layer.

It is a still further object of the invention to provide a graphite-free diamond fiber, a polycrystalline graphite-free diamond fiber, and fibers characterized in length from pulp, i.e., from about 1 mm to 5 mm, to staple, i.e., from about 0.25 inches to 1 inch, to continuous, i.e., of a length capable of being wound on, e.g., a bobbin.

Still a further object of the present invention is a layered structure including a layer of diamond and a layer of hydrocarbon material.

SUMMARY OF THE INVENTION

To achieve the foregoing and other objects, and in accordance with the purposes of the present invention, as embodied and broadly described herein, the present invention provides a method of preparing diamond by subjecting a solid hydrocarbon material to a plasma treatment in a gaseous feedstream for a sufficient period of time to form a diamond material characterized in that the atomic carbon of the resultant diamond material originates substantially from atomic carbon in the solid hydrocarbon material, said solid hydrocarbon material characterized as having sufficient resistance to etching so that carbon within said solid hydrocarbon material can be converted to diamond prior to being etched off in said plasma. In one embodiment of the invention, the method involves hydrocarbon material in the form of a hydrocarbon fiber.

The present invention further provides a method of pretreating the initial hydrocarbon material, e.g., pretreating a green hydrocarbon fiber for stabilization, prior to treatment with the plasma, by heating within an oxygen-containing atmosphere at temperatures sufficient to increase the melting point and oxygen-content of the green hydrocarbon fiber, but at temperatures insufficient to met or decompose the oxygenated green hydrocarbon fiber, followed by heating at temperatures sufficient to promote outgassing of the oxygenated green hydrocarbon fiber, but at temperatures insufficient to convert the oxygenated green hydrocarbon fiber to carbon or graphite.

The present invention further provides a diamond fiber having a diameter of from about 1 to about 50 microns, characterized by a strong signal in Raman spectroscopy of about 1332 $cm^{-1}$, and further characterized as substantially free of graphitic carbon. In one embodiment of the diamond fiber, the diamond fiber is characterized as polycrystalline. In another embodiment of the diamond fiber, the diamond fiber is characterized as a hollow fiber. In yet another embodiment of the invention the diamond fiber is characterized as solid.

DETAILED DESCRIPTION

Figure 1:
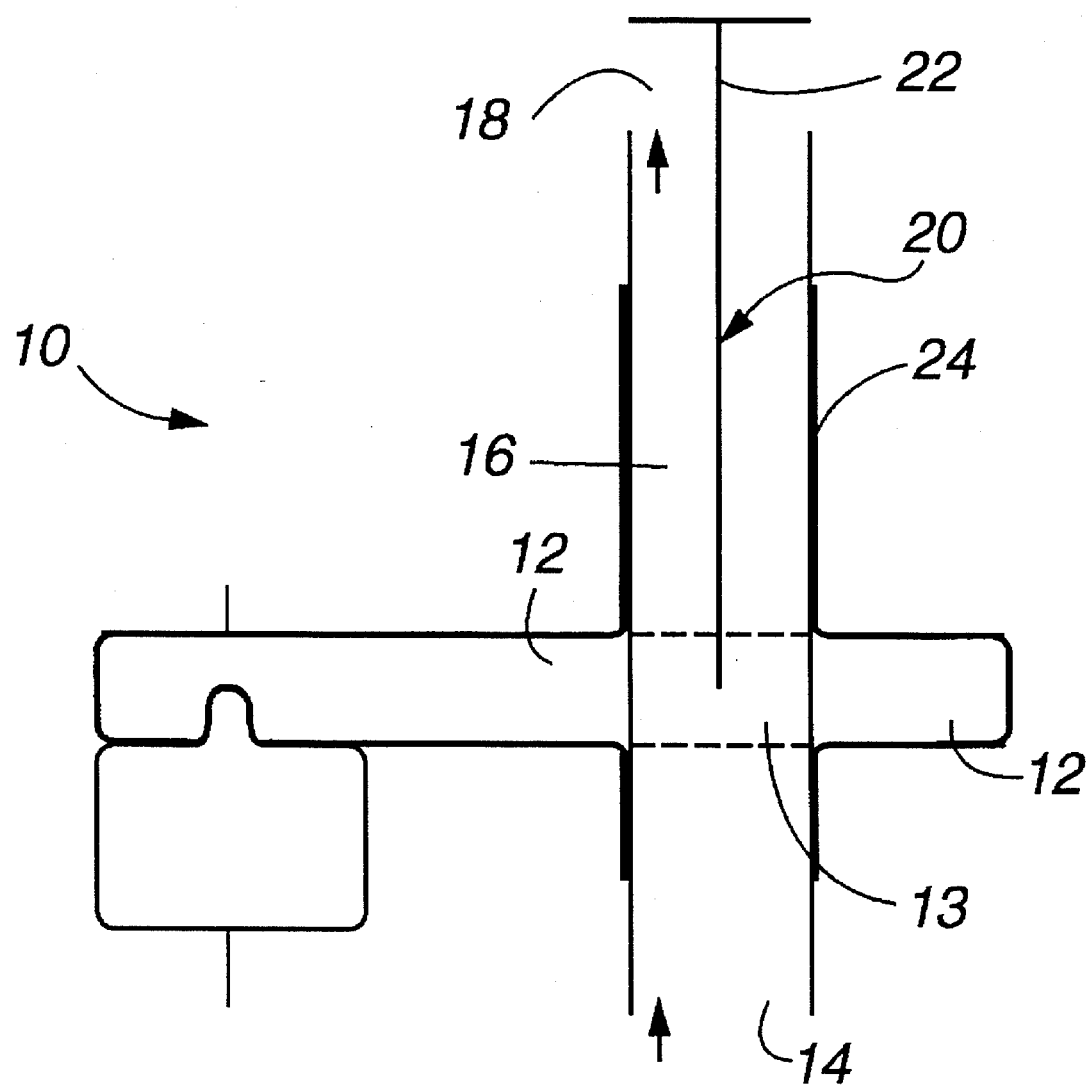
FIG. 1 illustrates a side view cross section of an apparatus for converting a hydrocarbon fiber to diamond fiber.

The present invention is concerned with conversion of a hydrocarbon solid, e.g., a hydrocarbon fiber, to diamond by use of a hydrogen plasma. By "hydrocarbon" is meant carbon-containing molecules with lesser amounts by weight of, e.g., hydrogen, oxygen, nitrogen. The hydrocarbon material used in the present process is not graphitic in nature or solid carbon, but should be a solid material under the processing conditions with a melting point or decomposition temperature above that of the processing conditions. By "conversion" is meant that carbon atoms within the precursor hydrocarbon solid are the predominant source of carbon atoms in the resultant diamond, i.e., the carbon source for the diamond is wholly or substantially from the carbon in the hydrocarbon material.

The hydrocarbon solid used as the diamond precursor material in the process of the present invention can generally be those materials commonly referred to as "green" materials. Among such green materials are those presently found useful in the preparation of, e.g., carbon fibers and graphite fibers. Such a green material may also be a cellulosic material such as is used in the preparation of, e.g., rayon fibers. By "green" material is meant that the material is not wholly cured or treated such as to have the desired chemical or physical properties of the resultant product material.

Carbon fibers and graphite fibers are generally classified into polyacrylonitrile (PAN) type and pitch type. Carbon fibers and graphite fibers of the pitch type are usually prepared by using coal, petroleum and the like as the starting material. When such carbonaceous materials are heated at temperatures from about 350° C. to about 500° C., the resultant fibers will generally show liquid crystalline orientation. Such orientation can provide additional beneficial properties to the fiber in terms of strength. Carbonization of both PAN and cellulose materials are well known in the art and are described, e.g., in "Carbon and Graphite Science" Douglas W McKee, Rev. Mater. Science, 3, 195–231 (1973).

One example of pitch is mesophase pitch, i.e., a carboneous pitch, derived from either petroleum or coal-tar, having a mesophase content of at least about 40 percent, as determined using polarized-light microscopy. Mesophase pitches are well known in the art and are described, e.g., in U.S. Pat. Nos. 4,005,183 and 4,208,267.

Green hydrocarbon materials, e.g., fibers, are preferably subjected to a stabilization or infusibilization process via an oxygenation prior to treatment within the plasma. Such a stabilization of the hydrocarbon material is believed necessary to increase resistance to plasma etching such that stabilized green hydrocarbon material can convert to diamond prior to etching away. Generally, such a stabilization process involves heating the hydrocarbon material within an oxygen-containing atmosphere at temperatures sufficient to increase the melting point and oxygen-content of the green hydrocarbon material, but at temperatures insufficient to melt or decompose the oxygenated green hydrocarbon material. It has also been found desirable to follow the stabilization process with an outgassing stage wherein the stabilized green hydrocarbon material is heated at temperatures sufficient to promote outgassing of the oxygenated green hydrocarbon fiber, but at temperatures insufficient to convert the oxygenated green hydrocarbon fiber to carbon or graphite.

Seed materials can be used with the hydrocarbon material in the present process and such seed materials can include diamond powder, carbon black, graphite powder, silicon carbide powder, or metal powder, e.g., copper or nickel powder, preferably diamond powder. The seed material is generally small, e.g., from about 0.01 to 1 micron in diameter, preferably about 0.1 microns in diameter. Generally, the limitation on the size of the seed material is related to the size of the hydrocarbon material, particularly in the case of hydrocarbon fibers wherein the seed material will not exceed the diameter of the fiber. When used, the seed material is added as a minor constituent of the hydrocarbon material, generally in amounts from about 0.1 percent by weight to about 10 percent by weight, preferably from about 0.1 to about 5 percent by weight based on the total weight of hydrocarbon material and seed material. Seed materials can be blended with the green hydrocarbon material during the preparation of, e.g., a green hydrocarbon fiber, or seed materials may be embedded in the surface of a green hydrocarbon material such as a fiber by pressing or any other suitable means.

In the present process, the plasma can be a primary plasma or a remote or secondary plasma. By "remote or secondary plasma" is meant a plasma remote from the site of plasma formation, e.g., at a site outside of a plasma generation chamber. In the present process, use of such a remote plasma is considered preferably in the conversion of the solid hydrocarbon material into diamond as opposed to the destruction of the hydrocarbon material by an overly energetic plasma. Destruction of the hydrocarbon by a primary plasma may be avoided by subjecting the hydrocarbon material to the primary plasma while the hydrocarbon material is on a backing, i.e., the hydrocarbon material is situated directly on a material, e.g., a metal block, which serves as a heat sink and alters the gas flow field of the plasma. Finally, it may be possible to briefly pretreat a hydrocarbon material such as a fiber within a remote or secondary plasma region and then to subject the thus treated fiber to a primary plasma without the need for any backing.

The plasma in the present process can be formed by microwave excitation or by hot filament excitation of the gaseous mixture within a plasma generation cavity. Generally, the input power to generate the plasma is within the range sufficient to form an energy density within the plasma cavity from between about 8 Watts per cubic centimeter (W/cc) and about 300 W/cc. Generation of a higher energy plasma is not generally desired as it is preferably a remote plasma outside of the plasma generation cavity that is used in the diamond conversion process.

The gas mixture for the gas feedstream into the plasma cavity can generally be any mixture including primarily hydrogen, i.e., generally at least about 75 percent hydrogen based on a mole percent. Other gases in the mixture can be hydrocarbon gases such as methane, ethane, propane, butane and the like, ethene, propene, butene and the like, or acetylene, propyne, butyne and the like. The gas mixture can also include a minor portion of oxygen which can be added in the form of oxygen or water vapor or by the addition of an oxygen-containing hydrocarbon such as an alcohol, e.g., methanol, an ether, e.g., methyl ether, or a ketone, e.g. acetone. Generally, by a minor portion of oxygen is meant up to about one percent by volume of the oxygen or oxygen-containing gas. The gas mixture may also include a minor amount of an ultraviolet absorbing gas such as, e.g., xenon, helium or argon. In one embodiment of the invention, the gas mixture is characterized as hydrocarbon-free, i.e., the gas mixture includes wholly or primarily hydrogen, and optionally a minor amount of, e.g., oxygen or water vapor, or an inert gas such as argon, nitrogen, helium and the like. In those cases where the gas mixture is hydrocarbon-free, it is clear that all of the carbon in the resultant diamond product originates in the solid hydrocarbon precursor. Even where minor amounts of a hydrocarbon gas is included in the gas mixture, substantially all of the carbon in the resultant diamond product originates in the solid hydrocarbon precursor. By "substantially all of the carbon" it is meant that generally at least about 90 percent of the diamond carbon atoms will have originated in the solid hydrocarbon precursor.

The gas flow rate through the apparatus used to convert the hydrocarbon material to diamond can generally be varied from about 10 standard cubic centimeters per minute (sccm) to 500 sccm, although the flow rate may be higher depending upon the size of the apparatus. Gas flow rate can affect transport distances of the reactive species into the remote or secondary plasma region and can affect the temperature within the system as higher flow rates result in lower or cooler gas temperatures.

The pressure within the conversion apparatus can generally be varied from about 10 Torr to about 100 Torr, preferably between about 20 Torr and 80 Torr. Pressure variations can affect deposition rate, outgassing characteristics, crystal morphology and can change the chemical composition of the plasma.

The hydrocarbon material, e.g., hydrocarbon fiber, is generally maintained at temperatures from about 700° C. to about 980° C. within the plasma stream to promote conversion to diamond, preferably from about 700° C. to about 900° C., and more preferably from about 700° C. to about 850° C. Temperatures beneath this range are generally insufficient to allow conversion to diamond while temperatures above this range can lead to problems such as etching away of the hydrocarbon material.

Hydrocarbon fibers in the present process generally have diameters from about 1 to about 50 microns, preferably diameters from about 5 to about 20 microns.

Residence time of the feed material for conversion to diamond will depend upon factors such as the energy level of the plasma, the temperature of the hydrocarbon material, seed density (if any), gas flow rate, seed material and seed size. Generally, residence time within the plasma can vary from about 10 minutes to about 24 hours, preferably from about 10 minutes to 6 hours. Necessary residence time will also be dependent upon the depth of conversion to diamond desired in the starting hydrocarbon material.

In FIG. 1, an apparatus for practicing the present process is shown. Apparatus 10 includes a waveguide 12 wherein the plasma is generated at primary plasma region 13 e.g., microwave energy. The gas mixture is flowed through gas inlet 14 through primary plasma region 13 and out through conversion chamber 16 towards gas outlet 18. The hydrocarbon material, e.g., the hydrocarbon fiber is positioned at the optimal remote plasma site from the plasma region 13, generally, e.g., at conversion point 20. The fiber 22 can be suspended from above down into conversion chamber 16. The hydrocarbon fiber is heated within the apparatus by heating means 24.

Figure 2:
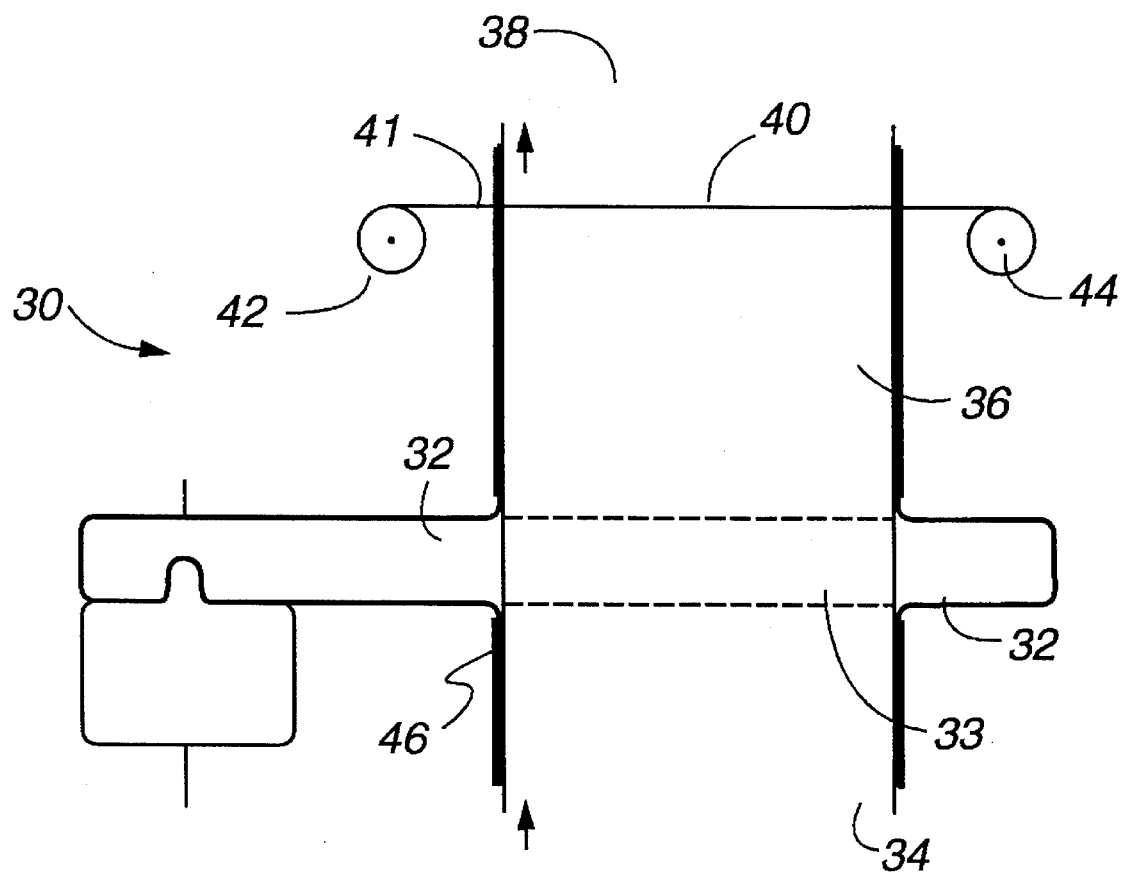
FIG. 2 illustrates a side view of another apparatus for converting a hydrocarbon fiber to diamond fiber.

In FIG. 2, another apparatus for practicing the present process is shown. Apparatus 30 includes a waveguide 32 wherein the plasma is generated at primary plasma region 23 by, e.g., microwave energy. The gas mixture is flowed through gas inlet 34 through plasma region 33 and out through conversion chamber 36 towards gas outlet 38. The hydrocarbon material, e.g., the hydrocarbon fiber is positioned at the optimal remote plasma site from the plasma region 33, generally, e.g., at conversion point 40. The fiber 41 can be passed between spools 42 and 44. The hydrocarbon fiber is heated within the apparatus by heating means 46.

Figure 3:
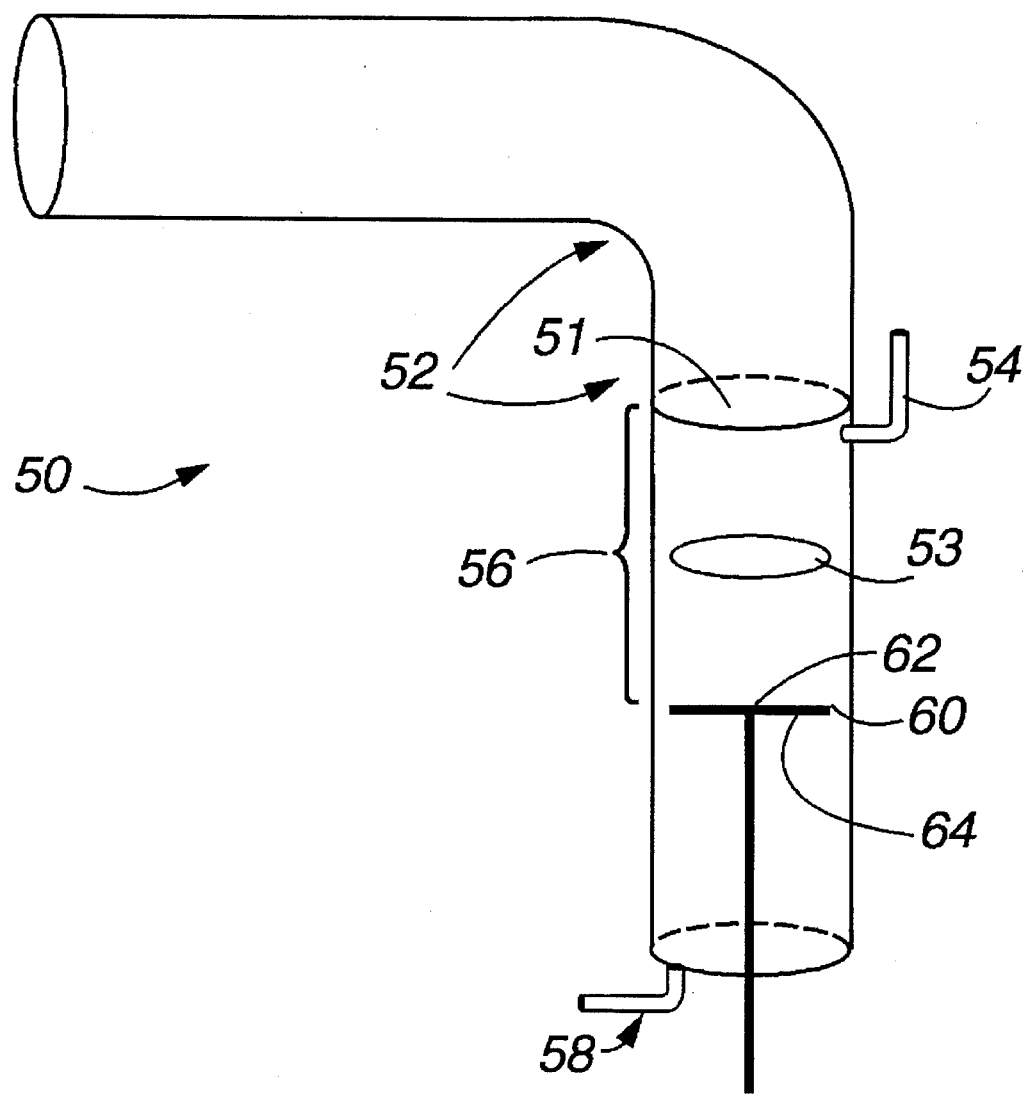
FIG. 3 illustrates a side view of still another apparatus for converting a hydrocarbon fiber to diamond fiber.

In FIG. 3, still another apparatus for practicing the present process is shown. Apparatus 50 includes a waveguide 52 wherein the plasma is generated at primary plasma region 53 by, e.g., microwave energy through window 51. The gas mixture is flowed through gas inlet 54 through plasma region 53 and out through conversion chamber 56 towards gas outlet 58. The hydrocarbon material, e.g., the hydrocarbon fiber can be positioned at a primary or remote plasma site by adjusting a movable block stage 60 whereupon the fiber 62 can be placed. The hydrocarbon fiber is heated within the apparatus by heating means 64 which heats stage 60 while the conversion chamber 56 can be cooled by, e.g., a water jacket.

In one embodiment of the present process, mesophase pitch is melted at, e.g., about 150° C., and a seed material such as diamond powder is blended into the melt in the desired amount. Green fibers are then formed by extruding the seeded mesophase pitch through spinnerets to form the fibers. These green fibers are then subjected to stabilization or infusibilization via an oxygenation. The method and apparatus of U.S. Pat. No. 4,576,810 may be employed, i.e., the as-spun green fiber can be collected upon a spinning spool or bobbin and then directly oxidized by heating in air or in a mixture of oxygen and an inert gas. In general, the amount of oxygen in the gaseous mixture during the stabilization will be from about 1 percent by volume to about 21 percent by volume, the higher figure being reached when air is used. The temperature during stabilization can generally vary from about 200° C. to about 340° C. and the stabilization can generally take place over a period of several hours. The result of this stabilization is believed to be the formation of some degree of crosslinking within the green fibers as suggested by the observed increase in melting point of the green fibers.

The stabilized seeded green fibers are then subjected to a heating stage designed to promote outgassing from the fibers. In this heating stage, the fibers are heated at temperatures sufficient to promote outgassing but beneath those temperatures sufficient to convert the stabilized green fiber into graphite. In the production of graphite fibers, heating generally proceeds through a pre-carbonization heating at temperatures from about 400° C. to about 800° C., through a primary carbonization heating at temperatures from about 1000° C. to about 2000° C. and finally into a graphitization heating at temperatures generally ranging from 2400° C. to about 3300° C. Thus, the temperature during outgassing is generally maintained at temperatures between about 500° C. and 800° C., preferably between about 700° C. and 800° C. Outgassing is generally carried out for from about 30 minutes to about 120 minutes, although the time can be varied greatly depending upon the size of the hydrocarbon material.

The resultant fiber material after the stabilization and outgassing is then subjected to a plasma in a hydrogen atmosphere, preferably a pure hydrogen atmosphere under remote or secondary plasma conditions to convert hydrocarbon material to diamond. Alternatively to a pure hydrogen atmosphere, a mixture of hydrogen and a gas such as argon could be used, although preferably hydrogen is a majority of the mixture on a mole basis, and more preferably hydrogen is at least 75 percent of the gas mixture on a mole basis.

Treatment of a hydrocarbon fiber, e.g., a stabilized mesophase pitch fiber can produce a resultant diamond fiber. Such a diamond fiber can be solid in nature or hollow in nature. While not wishing to be bound by the present explanation, it is presently believed that initial conversion of some of the carbon from the hydrocarbon into diamond results in the formation of an outer diamond skin or diamond crust. Then, remaining hydrocarbon is etched or eaten away without substantial additional conversion into additional diamond thus leaving a hollow diamond fiber. Alternatively, a solid diamond fiber may be produced by shielding one side of the fiber with, e.g., copper or silicon, whereupon conversion from the plasma treatment would proceed in only a single direction thereby limiting the pull of material from the middle of the fiber. In that case the resultant diamond fiber may not necessarily be cylindrical-like in nature, but may be solid. A solid diamond fiber may also be produced by a pulsed plasma process, i.e., by briefly pulsing in hydrogen and then briefly pulsing on the power for the plasma. By such an oscillating type process, the etching of the interior of the fiber after formation of a diamond skin may be avoided.

Diamond fibers formed in the present process can be categorized into pulp fibers having lengths of from about 1 mm to about 5 mm, into staple fibers having lengths of from about 0.25 inches to about 1 inch, or into continuous fibers of greater than 1 inch and more usually of a length capable of being would upon, e.g., a bobbin. Generally, diamond fibers from the present process will have an aspect ratio, i.e., the ratio of fiber length to fiber diameter, of from about 100 to 1 to about 500 to 1 or more, preferably at least about 100 to 1. The diamond fibers formed in the present process are also characterized as polycrystalline, at least where the solid hydrocarbon material was seeded with diamond powder.

The present invention is more particularly described in the following examples which are intended as illustrative only, since numerous modifications and variations will be apparent to those skilled in the art.

EXAMPLE 1

Two sets of oxygen-stabilized hydrocarbon precursor fibers, the fibers about 10 microns in diameter, were doped respectively with 1 percent by weight and 5 percent by weight diamond dust or seed, the diamond dust about 0.1 microns in diameter. The diamond-doped, oxygen-stabilized hydrocarbon precursor fibers were then subjected to a hydrogen plasma in an reactor apparatus as shown in FIG. 3 under the following conditions: temperature of from about 700° C. to about 850° C; reactor atmosphere of 100 percent hydrogen; pressure of from about 40 Torr to about 100 Torr; gas flow rate of from about 50 sccm to about 500 sccm; input power of from about 800 Watts to about 1500 Watts; and, treatment time from about 4 hours to about 18 hours.

While previous sets of as-extruded (but not oxygen-stabilized) diamond-doped hydrocarbon precursor fibers were destroyed by evaporation under the above conditions, the oxygen-stabilized fibers were not destroyed and the fibers showed conversion to diamond.

The fibers were analyzed by Secondary Electron Microscopy (SEM), X-ray Photoelectron Spectroscopy (XPS), and Raman Spectroscopy. The degree of conversion to diamond was found to increase with an increase in the diamond seed concentration. The fibers including 5 percent by weight diamond seed showed diamond crystals of greater than 1 micron diameter and well defined facets in comparison to the original size of the diamond seed of about 0.1 microns in diameter.

EXAMPLE 2

An oxygen-stabilized hydrocarbon bundle of about 12 inches long precursor fibers of about 10 microns diameter, doped with 1 percent by weight diamond dust, the diamond dust of about 0.1 microns in diameter was used, much as in Example 1. The fibers were subjected to a pre-heating step to aid outgassing of volatile low molecular weight compounds and impurities by heating at 500° C. under a vacuum of less than 1 Torr for about 1 hour. No visible change in appearance of the fibers was observed during this pre-heating step. Then, the fiber bundle was suspended vertically in a vertical quartz plasma reaction tube, as shown in the apparatus of FIG. 1, the tube encircled with a AstexTM Model No. CS2 wave guide with a Model SXRH microwave source driven with a 1500 Watt power supply. The fiber bundle was positioned so that the end of the bundle reached into the primary plasma cavity of the wave guide with the remainder of the fiber bundle being outside of the cavity and thus in the remote or secondary plasma zone. The fibers were treated at 600 Watts total power input for about 20 minutes at a pressure of 40 Torr with a hydrogen gas flow atmosphere set at 25 sccm. Oxygen was mixed with the hydrogen in the form of an air bleed making up about 1 percent by volume of the total flow, remainder hydrogen.

Figure 4:
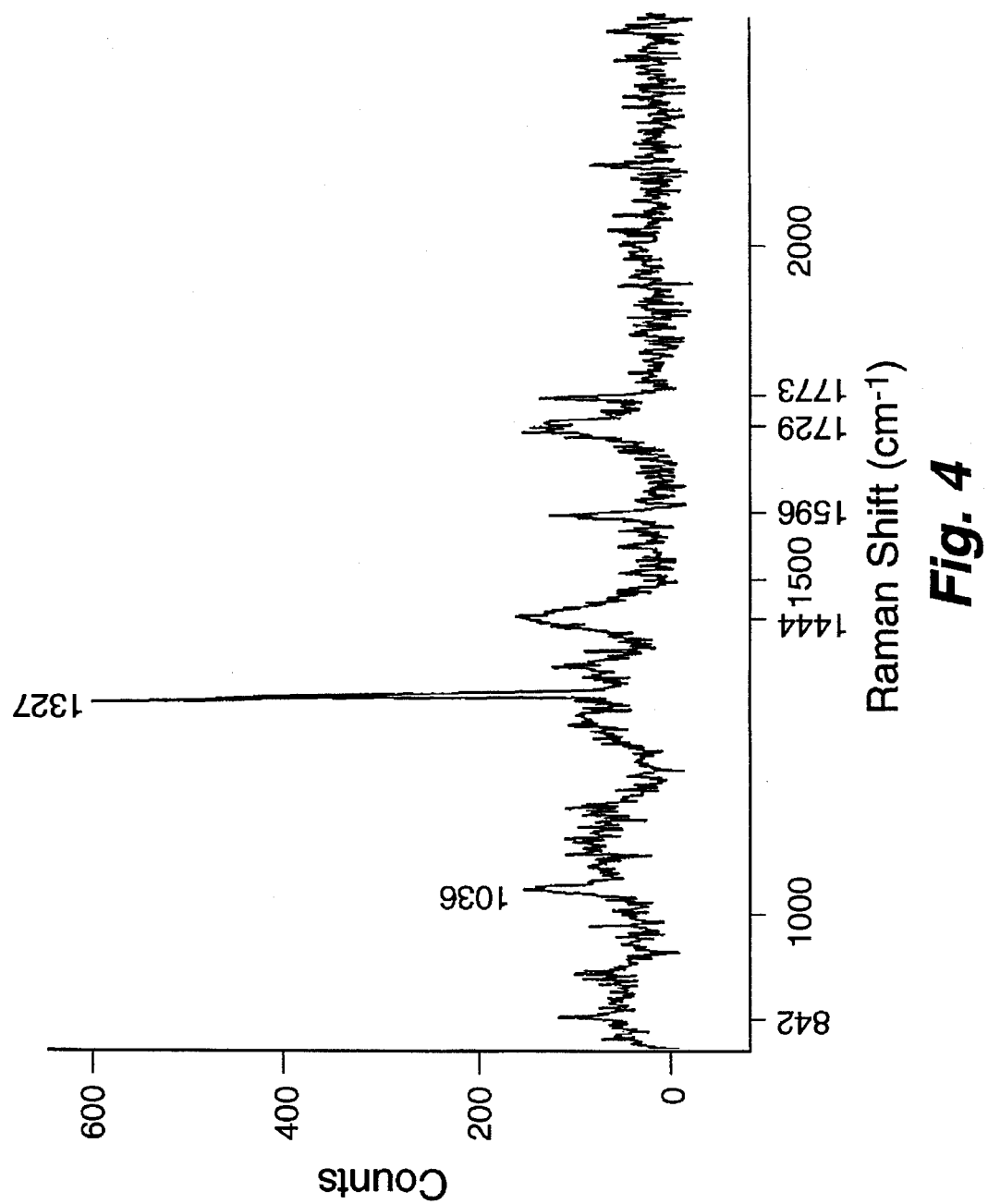
FIG. 4 is a graph showing the Raman spectroscopy of a fiber prepared in accordance with the present invention.

At the end of the experiment, the fibers that were in the primary plasma zone were wholly destroyed with only the fibers in the remote or secondary plasma zone remaining. It was observed that the fibers had progressively changed color from white nearest the primary plasma zone, to gray about 1 to 2 inches from the primary plasma zone, to very little change from the original shiny black at about 10 inches from the primary plasma zone. The white colored portion of the fibers were examined and found to contain a fraction of optically clear fibers that exhibit the characteristic Raman spectroscopy signal at about 1332 $cm^{-1}$ for diamond without any observed graphite Raman signal. FIG. 4 shows the Raman signal with the sharp peak slightly shifted at 1327 $cm^{-1}$.

In contrast, observations from another run wherein the fiber bundle was not oxygen stabilized, indicated that all fibers were effectively destroyed except those very far from either the primary plasma zone or the remote or secondary plasma zone. No color change was seen in these remote fibers nor was any other chemical, morphological or state conversion seen.

Although the present invention has been described with reference to specific details, it is not intended that such details should be regarded as limitations upon the scope of the invention, except as and to the extent that they are included in the accompanying claims.

What is claimed is:

1. A method of preparing diamond comprising subjecting a solid material selected from the group consisting of hydrocarbons, mesophase pitch, polyacrylonitrile and cellulose to a plasma treatment in a gaseous feedstream for a sufficient period of time to form a diamond material, said diamond material characterized in that the atomic carbon of the resultant diamond material originates substantially from atomic carbon in the solid material, said solid material characterized as having sufficient resistance to etching so that carbon within said solid material can be converted to diamond prior to being etched off in said plasma.

2. The method of claim 1 wherein said plasma is a remote plasma.

3. The method of claim 1 wherein said solid material is an oxygen stabilized green material.

4. The method of claim 1 wherein the gaseous feedstream is hydrocarbon-free.

5. The method of claim 1 wherein said hydrocarbon material is pretreated by heating within an oxygen-containing atmosphere at temperatures sufficient to increase crosslinking within said hydrocarbon material, but at temperatures insufficient to melt or decompose said hydrocarbon material, followed by heating at temperatures sufficient to promote outgassing of said crosslinked hydrocarbon material, but at temperatures insufficient to convert said hydrocarbon material to carbon.

6. The method of claim 1 wherein said solid material is made from mesophase pitch.

7. The method of claim 1 wherein said solid material contains seed particles composed of a material selected from the group consisting of diamond powder, graphite powder, and carbon black.

8. A method of preparing diamond comprising subjecting a solid fiber of a material selected from the group consisting of hydrocarbons, mesophase pitch, polyacrylonitrile and cellulose to a plasma treatment in a gaseous feedstream for a sufficient period of time to form a diamond material, said diamond material characterized in that the atomic carbon of the resultant diamond material originates substantially from atomic carbon in the solid fiber, said solid fiber characterized as having sufficient resistance to etching so that carbon within said solid fiber can be converted to diamond prior to being etched off in said plasma.

9. The method of claim 8 wherein said plasma is a remote plasma.

10. The method of claim 8 wherein said solid fiber is an oxygen stabilized green fiber.

11. The method of claim 8 wherein the gaseous feedstream is hydrocarbon-free.

12. The method of claim 8 wherein said solid fiber is pretreated by heating in an oxygen-containing atmosphere at temperatures sufficient to increase crosslinking within said fiber, but at temperatures insufficient to melt or decompose said fiber, followed by heating at temperatures sufficient to promote outgassing of said crosslinked fiber, but at temperatures insufficient to convert said fiber to carbon.

13. The method of claim 8 wherein said solid fiber is made from mesophase pitch.

14. The method of claim 8 wherein said solid fiber contains seed particles composed of a material selected from the group consisting of diamond powder, graphite powder, and carbon black.

* * * * *